July 31, 1945.   C. H. MILLER   2,380,664
LAYOUT FIXTURE
Filed Oct. 29, 1943   2 Sheets-Sheet 1
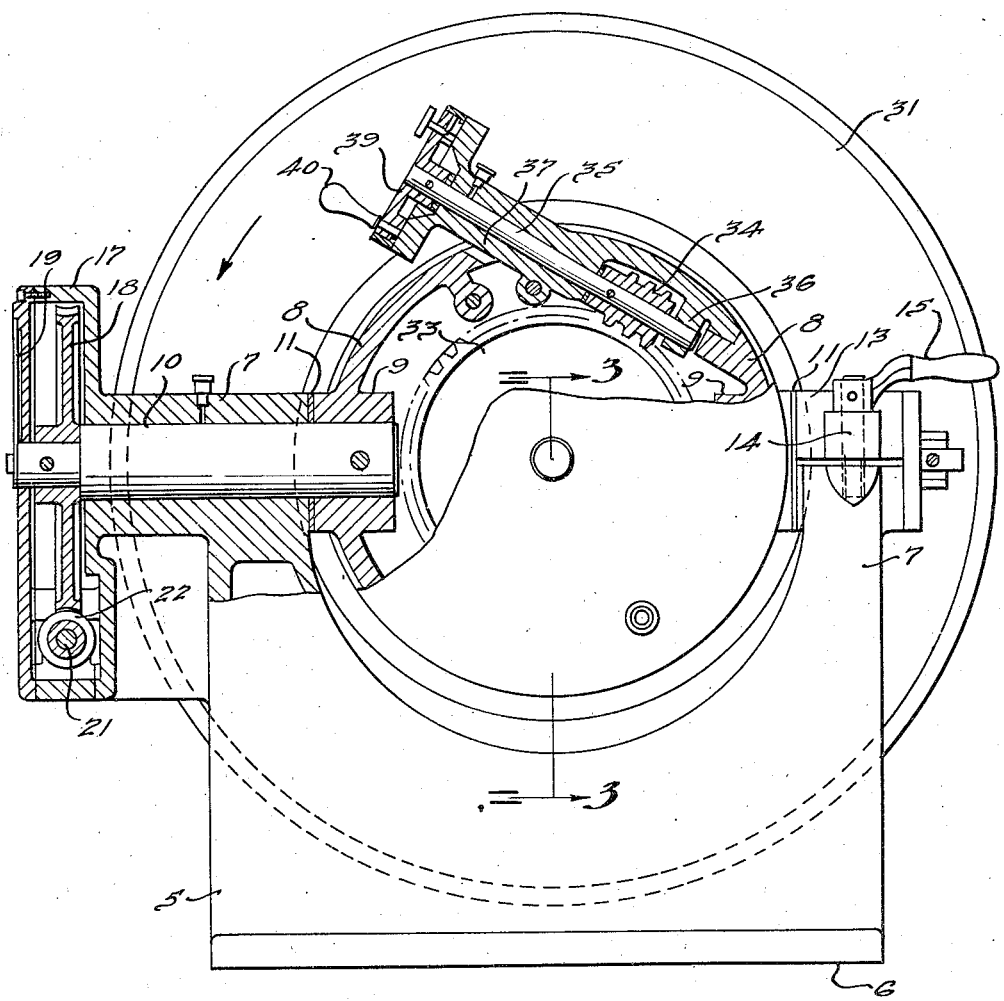
INVENTOR.
Clarence H. Miller.
BY
Harness, Dickey & Pierce

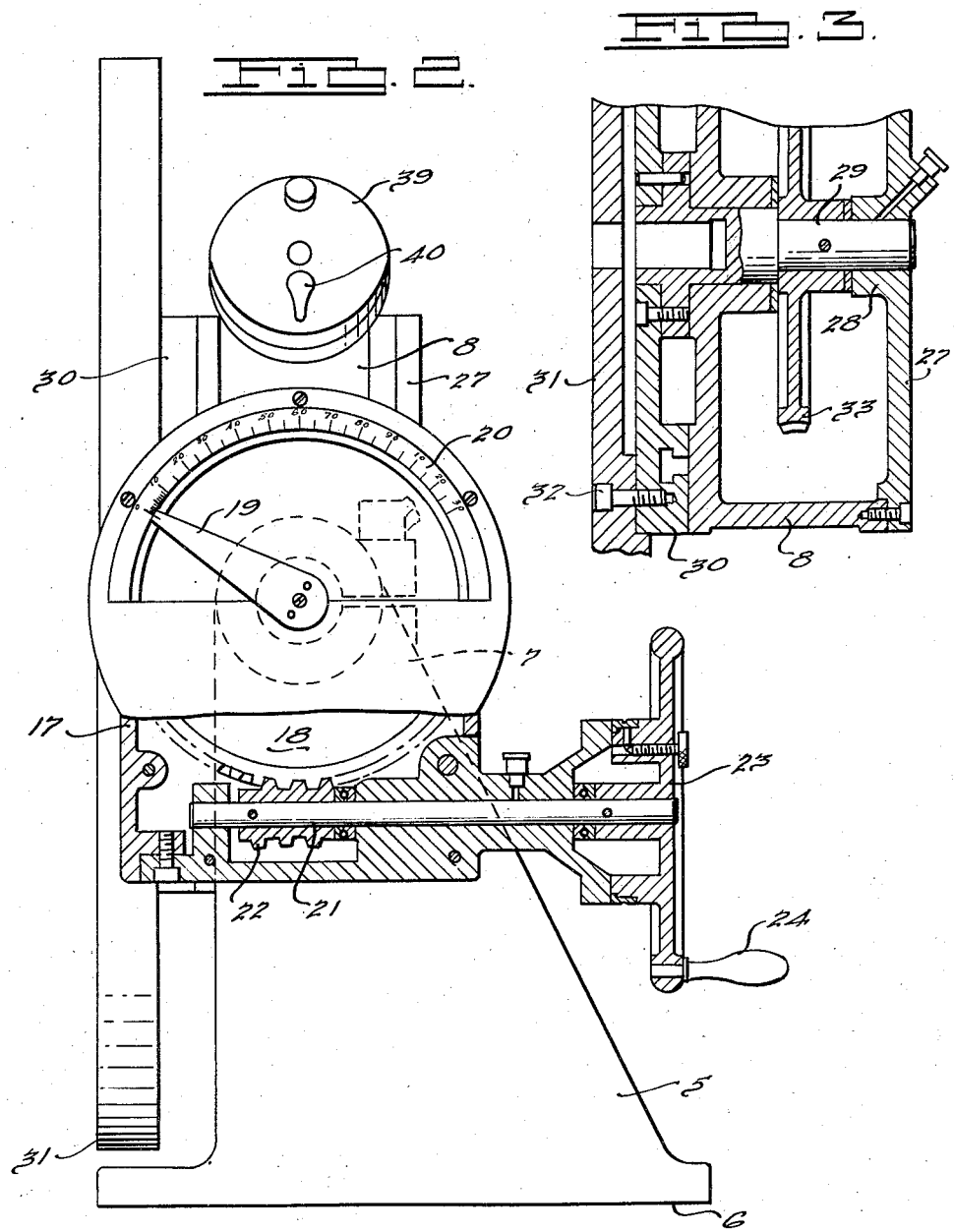

Patented July 31, 1945

2,380,664

UNITED STATES PATENT OFFICE 2,380,664

LAYOUT FIXTURE

Clarence H. Miller, Detroit, Mich., assignor to Machine Products Corporation, Detroit, Mich., a corporation of Michigan Application October 29, 1943, Serial No. 508,179

1 Claim. (Cl. 33—174)

This invention relates generally to checking fixtures, and more particularly, it relates to a precise layout table assembly designed and intended for precision adjustable movement about two separate axes, these axes of movement being perpendicular to each other, thus making possible adjustment of the face of the table throughout a wide variety of positions.

While, of course, the device of the present invention will have a wide variety of uses for checking and measuring parts, it is particularly adaptable for checking more or less circular parts having radial portions and, as will hereinafter be more clearly seen, the device may function more or less as a dividing head if desired.

The principal object of the present invention is to provide a rugged, accurate, and precise piece of apparatus of the general character described above, which will be simple and convenient to operate and which at the same time will provide a maximum of accuracy for checking and layout parts.

Many other and further objects, advantages, and features of the present invention will become apparent from the following specification, the drawings relating thereto, and from the claim hereinafter set forth.

In the drawings:

Figure 1 is a front elevational view with parts broken away, showing a layout checking fixture embodying the improvements of the present invention.

Figure 2 is a side elevational view of the apparatus shown in Figure 1, similarly having the parts broken away and parts in section to facilitate illustration of the construction thereof.

Figure 3 is a fragmentary, sectional view taken substantially on the line 3—3 of Figure 1, illustrating in further detail the general construction and arrangement of parts.

With more particular reference to the drawings, it will be readily appreciated that the specific device illustrated therein and described below is merely illustrative of one form of the present invention embodying the novel improvements shown in the drawings and hereinafter described in detail, and it will likewise be appreciated that material modification of the construction shown may be made without departing from the spirit and scope of the invention as set forth in the appended claim.

In the specific embodiment of the invention illustrated, it will be seen that the apparatus comprises a relatively heavy cast base member 5, the bottom or supporting surface of which is preferably finished with a high degree of precision to provide a plane surface in order that the completed structure may be used upon a conventional surface plate and when so used will provide great accuracy with respect to the surface plate.

The upwardly extending portions 7 of the base member together form a yoke and each of these portions serves to provide a bearing for a table support member 8. The table support member 8 is generally circular in form and includes a pair of diametrically opposed bosses 9 which serve to provide means for mounting trunnions 10 journalled for rotation in the axially aligned bearings provided by the bosses 7. The axial position of the table supporting member 8 is precisely controlled by thrust bearing washers 11 interposed between the bosses 9 and the axial inner faces of the portions 7 of the main base member 5. The bearing construction on the righthand side of the yoke shown in Figure 1 of the drawings comprises a slip bearing construction in which the upper half 13 of the bearing may be urged toward the lower half by means of a screw 14 operated by a hand lever 15 and it will be readily appreciated that this construction provides means for positively clamping the table supporting member 8 in predetermined desired position.

Located outwardly of the bearing construction on the lefthand side of the apparatus, as shown in Figure 1, is a housing 17 of generally circular form which serves to enclose a worm wheel 18 anchored to the outer end of the trunnion shaft 10. This shaft 10 extends completely through the housing 17 and has anchored to the outer end thereof a pointer or indicator 19 shown in both Figures 1 and 2, which cooperates with a semi-circular scale 20 secured to the exterior surface of the housing 17. Also journalled in the housing 17 in suitable bearings is a shaft 21 which carries anchored thereto a worm 22 mounted in meshing engagement with worm wheel 18. This shaft 21 extends outwardly from the housing and has a hand wheel 23 anchored thereto. This hand wheel, as is conventional, may be provided with a crank 24 and it will be seen that upon rotation of this wheel 23 and shaft 21, the table support 8 will be rotated about the axis of the trunnions 10.

The table support member 8, generally drum-shaped, has one side thereof closed by a cover plate 27 which is provided in the center thereof with a bearing 28 for a shaft 29 which shaft has anchored thereto a face plate 30 to which the table 31 is secured by means of bolts 32. Anchored to the shaft 29 is a worm wheel 33 which, as is clearly seen in Figure 1, meshes with a worm 34 on a shaft 35 journalled in suitable bearings provided in bosses 36 and 37 formed in the housing 8. Shaft 35 may be conveniently manually rotated by means of an indicator wheel 39 in which is mounted a crank 40.

From the foregoing description, together with reference to the drawings, it will be seen that the base member 5 may be formed in such a way that the face of the table 31 may be swung from a vertical position througuhout 120° by rotation of the wheel 23. Similarly, the work plate may be rotated throughout 360° by rotation of the crank 40. In this connection it will be noted, referring to Figure 1, that the shaft 35 occupies the same plane as the trunnions 10 and that the handwheel 39 for turning the shaft 35 is fixed thereto at the end most proximate to the handwheel 23. Hence, when the handwheel 23 is operated to cause the table and the drum-like support to turn on the trunnions 10, the handwheel 39 swings in an arc about the axis about which the support and table turn. Thereby a relationship is maintained between the two handwheels which will enable the latter to be operated with facility regardless of the angular position of the drum-like support with respect to the base and to the angular position of the table with respect to the support. All necessary adjustments of the table and the drum-like support and reading of the indicating means may, therefore, be made from the same side of the fixture.

In operation of the device, the part to be laid out or checked may be anchored in predetermined desired position on the face plate and on the table 31 and exact and precise adjustments may be made by means of the hand wheel 23 and the crank 40 in order to swing the table through the desired positions. Extremely accurate and precise measurements may be made with respect to the location of the part with reference to the surface plate on which the surface is mounted. It will be obvious that in view of the rugged construction and accurate adjustments possible, extremely precise layouts or measurements may be made.

As has hereinbefore been pointed out, the specific embodiment of the invention just described is merely illustrative of one form which the invention may take and it will be likewise obvious that other forms may be made within the scope of the invention as defined in the following claim.

What is claimed is:

A checking or locating fixture comprising, in combination, a supporting base having the under side thereof finished to provide a substantially plane surface and having upwardly extending, spaced-apart arms which provide axially aligned bearings, a drum-like support having coaxial trunnions which are journaled in said bearings to provide for turning movements of said support about an axis parallel to said plane surface, a table carried by said support, a worm wheel fixed to one of said trunnions, a housing for said worm wheel carried by one of said arms, a worm in said housing which meshes with said worm wheel, a shaft journaled in said housing for driving said worm, a handwheel carried by said shaft, means associated with one of said trunnions for indicating the angular position of said support and table with respect to said supporting base, a spindle journaled in said drum-like support for driving said table, the axis of said spindle being normal to the axis about which said support turns, a second worm wheel fixed to said spindle, a second shaft carried by and journaled in said support, a worm carried by said second shaft and meshing with said second worm wheel, said second shaft occupying substantially the same plane as said trunnions and having its axis angularly inclined with respect to the axes of said trunnions, and a second handwheel fixed to the end of said second shaft most proximate to said first mentioned handwheel, whereby as said first mentioned handwheel is operated to cause said support to turn on said trunnions, said second handwheel swings in an arc about the axis about which said support turns and in so doing maintains relationship between the two handwheels which will enable the latter to be operated with facility regardless of the angular position of said support with respect to said base and and the angular position of said table with respect to said support.

CLARENCE H. MILLER.